of the United States Patent

Lee et al.

[11] 4,297,305
[45] Oct. 27, 1981

[54] NUCLEAR FUEL RECYCLING SYSTEM

[75] Inventors: Harvey R. Lee, Omemee; Arnold K. Koch, Etobicoke; Adam Krawczyk, Mississauga, all of Canada

[73] Assignee: Canadian General Electric Company Limited, Toronto, Canada

[21] Appl. No.: 60,884

[22] Filed: Jul. 26, 1979

[51] Int. Cl.³ .............................................. G01C 21/00
[52] U.S. Cl. ...................................... 264/0.5; 241/21; 252/627
[58] Field of Search ................. 252/301.1 W; 264/0.5; 241/21

[56] References Cited
FOREIGN PATENT DOCUMENTS
646281 1/1963 Canada .
2559019 9/1976 Fed. Rep. of Germany ....... 264/0.5
1079042 8/1967 United Kingdom ................. 264/0.5

Primary Examiner—Leland A. Sebastian
Attorney, Agent, or Firm—Ivor J. James; Raymond G. Simkins; Samuel E. Turner

[57] ABSTRACT

In the processes of nuclear fuel manufacture, scrap material such as uncontaminated reject powder and reject pellets, which would previously have been reprocessed chemially in conversion of the uranium values by dissolution into liquid form, is now mechanically reduced by crushing in a substantially inert atmosphere and converted to a slurry having between about 70 to 85 weight per cent solids, and then attrition milled utilizing scrap sintered $UO_2$ pellets as the reducing medium. Grinding swarf generated during the centerless grinding of $UO_2$ pellets may also be recycled provided it is sufficiently pure.

6 Claims, No Drawings

NUCLEAR FUEL RECYCLING SYSTEM

BACKGROUND

This invention is directed to a method of recycling scrap nuclear material, and nuclear fuel manufactured by the process.

In the manufacture of nuclear fuel for use in nuclear reactors, the conditions of service to which the fuel is subject within a reactor are so demanding that very high manufacturing standards must be met, which leads to a comparatively high volume of reject sintered pellet material, and the need for recycling this reject fuel material. In addition to pelleted material, the swarf resulting from pellet grinding also requires to be recycled. At present such nuclear fuel recycling generally relies upon chemical dissolution of uranium values into liquid form followed by purification, precipitation and eventual powder manufacture.

SUMMARY

In accordance with the present invention, suitable scrap material may be prepared mechanically by crushing and milling as a high solids content slurry, using scrap sintered $UO_2$ pellets as the grinding medium, to provide powder of acceptable density and purity for recycling in a pellet production line. In order to optimize utilization of the present fuel scrap retrieval system, the grinding wheels used in initially grinding sintered pellets require to be such that they do not introduce contamination into the process (e.g. use of diamond wheels) in order to maintain the purity of the ensuing grinding swarf, for retrieval through the subject mechanical process.

The use of $UO_2$ sintered balls as the grinding media is shown in Canadian Pat. No. 656,281, Moss, dated Jan. 22, 1963.

In accordance with the invention there is provided a method of producing nuclear fuel from retrieved nuclear fuel material of high purity selected from the group comprising substantially uncontaminated grinding swarf and powder and pelleted fuel, including the steps of:

(1) crushing scrap pellets to a fine powder (2) mixing with grinding swarf and clean and virgin powder, and adding liquid to form a slurry having a density in the range 70 to 85 weight percent solids;

(3) adding sintered $UO_2$ pellets as grinding media, to the slurry in an attrition mill, and (4) grinding the slurry and pellets in the mill to a predetermined consistency. The process can include green pellet forms in the material being treated.

The resulting ground slurry is dried to a cake and granulated. The dried granulated powder is recycled to a fuel pelleting line in combination with virgin feed stock. The virgin feed stock is usually subjected to the milling process simultaneously with the recycled material.

In carrying out the initial step of crushing the scrap $UO_2$ material which is highly oxidizable, the spraying of liquid nitrogen for purposes of providing an inert atmosphere also serves to reduce the temperature of the $UO_2$ significantly, to increase its brittleness and reduce its reactivity, thereby significantly diminishing wear on the hammer mill while providing a substantially inert atmosphere.

The subject process offers large savings, both in avoidance of needless dissolution reprocessing, and in the fact that undue handling of reject nuclear fuel by shipping it to a distant dissolution plant is avoided, while the dried powder that the process yields is of excellent size distribution and purity for use in the pellet making process.

The step of pulverizing pelleted material can involve the use of jaw crushers and hammer mills in a suitably inert atmosphere, preferably using liquid nitrogen as referred to above, with unsintered (green) pellets being added at the hammer mill stage of reduction.

The starting materials of this process may include any of: grinding swarf, sintered scrap, green scrap and clean or virgin powder.

The sintered scrap is subject to a jaw crusher operation to reduce it to a powder. The powder then passes to a hammer mill, operated generally in a liquid nitrogen atmosphere to which any available green scrap (non-sintered) is added. Available grinding swarf in a substantially non-contaminated condition is added to the crushed material and the mixture passed to a wet mill utilizing reject sintered fuel pellets as the reducing media, the slurry having a high solids content, normally in the range 70 to 85 weight percent solids, and including virgin fuel powder ($UO_2$). The milled material is dried when a predetermined consistency has been achieved, and processed into pellets.

The virgin $UO_2$ powder is normally added as a component of the slurry in the wet ball mill, so that when dried, the ball mill product is in a suitable condition for repelleting.

In the subject process, by selection of substantially uncontaminated materials, together with steps to substantially preclude oxidation of the material during processing, the need for chemical recycling can be avoided, in large measure, and an end product of suitable purity and appropriate particle size distribution obtained, to facilitate repelleting.

Significant cost savings may be effected, both in handling and in transportation, while the nuclear fuel inventory also is reduced, with commensurate savings.

The embodiments of the invention in which an exclusive property or privilege is claimed are defined as follows:

1. The method of producing nuclear fuel comprising retrieved nuclear fuel material selected from the group comprising substantially uncontaminated grinding swarf, sintered pellets and green pellet forms, including the steps of:

(1) crushing pelleted material to fine powder in a substantially inert atmosphere;

(2) mixing with grinding swarf and liquid to form a slurry having a content between about 70 to 85 weight percent solids;

(3) adding sintered $UO_2$ pellets as grinding media to the slurry within a wet mill and (4) wet grinding the slurry with the pellets in the wet mill, to a predetermined consistency.

2. The method as claimed in claim 1 including the steps of drying said ground slurry to a powder, and recycling the powder for manufacture to pellet form.

3. The method as claimed in claim 1 or claim 2, wherein said slurry solids content is about 85 weight percent.

4. The method as claimed in claim 1 wherein said slurry includes the addition of clean powder $UO_2$.

5. The method as claimed in claim 4 wherein said clean powder is virgin $UO_2$.

6. The method as claimed in claim 1, wherein the first step includes adding liquid nitrogen during the crushing to provide an inert atmosphere, whereby the temperature of the material is significantly reduced, to provide enhanced crushing action.

* * * * *